United States Patent [19]
Schmidt et al.

[11] Patent Number: 5,170,197
[45] Date of Patent: Dec. 8, 1992

[54] PANNING HEAD, WITH A TORQUE SENSOR

[75] Inventors: Günther Schmidt, Pullach; Christoph Rüchardt, Wangen; Erwin Tillschneider, Munich, all of Fed. Rep. of Germany

[73] Assignee: Sachtler AG Kommunikationstechnik, Fed. Rep. of Germany

[21] Appl. No.: 673,701

[22] Filed: Mar. 21, 1991

[30] Foreign Application Priority Data

Mar. 21, 1990 [DE] Fed. Rep. of Germany ....... 4009026

[51] Int. Cl.⁵ .................. G03B 29/00; G03B 17/00; F16M 13/00; F16M 11/08
[52] U.S. Cl. ..................... 354/81; 354/293; 352/243; 248/550; 248/186
[58] Field of Search .............. 354/81, 293; 352/243; 248/177, 183, 179, 186, 550; 73/863.32, 863.33, 863.35

[56] References Cited

U.S. PATENT DOCUMENTS

| 3,164,838 | 1/1965 | Heinrich | 352/69 |
| 4,226,303 | 10/1980 | Thoma | 188/322.5 |
| 4,447,033 | 5/1984 | Jaumann et al. | 248/563 |
| 4,457,610 | 7/1984 | Kawazoe | 354/293 |
| 4,655,567 | 4/1987 | Morley | 352/243 |
| 4,673,268 | 6/1987 | Wheeler et al. | 352/243 |
| 4,757,970 | 7/1988 | Nakazawa et al. | 248/571 |

FOREIGN PATENT DOCUMENTS

| 2717772 | 4/1977 | Fed. Rep. of Germany. |
| 2657692 | 6/1978 | Fed. Rep. of Germany. |
| 3026379 | 2/1981 | Fed. Rep. of Germany. |
| 3908682 | 10/1990 | Fed. Rep. of Germany. |
| 2231548 | 11/1990 | United Kingdom. |

Primary Examiner—Michael L. Gellner
Assistant Examiner—J. K. Han
Attorney, Agent, or Firm—Sprung Horn Kramer & Woods

[57] ABSTRACT

This invention relates to a pan head (1) for supporting a device, preferably a film or television camera (2), having a stator (6) and a rotor (7) swiveling about a pitch axis (A) of the stator (6), whereby the rotor (7) supports the device (2). To permit determination of the torque between the rotor and stator with the device fitted on, and thus to facilitate e.g. the "balancing" of the fitted device in the zero position of the rotor (7), a torque sensor (31) is integrated into the pan head (1) for detecting the torque in several pitching positions of the rotor (7).

20 Claims, 6 Drawing Sheets

☒ SHIFTING BY Δx    ☐ RESTING POSITION

PANNING HEAD, WITH A TORQUE SENSOR

BACKGROUND OF THE INVENTION

The present invention relates to pan heads, are in particular for film or television cameras.

Such a pan head is known, for example, from the German Patent No. 26 57 692 and its corresponding U.S. Pat. No. 4,226,303, as well as the German Patent No. 3,908,682 and its corresponding published UK patent application No. 2,231,548, the disclosures of which are incorporated herein by reference. This pan head serves to rotate a film or television camera about two mutually perpendicular axes, namely a horizontal pitch axis and a vertical swivel axis. Pan heads also serve to hold other, e.g. optical, devices.

To permit soft swivel movements, pan heads are generally provided with a damping means, e.g. a plurality of hydraulic damping units, as described in the above patent.

Such pan heads are also frequently provided with compensating devices for compensating the torque of the fitted device in essentially all rotary positions about the pitch axis; such an arrangement is known, for example, from the German Patent No. 30 26 379 and its corresponding U.S. Pat. No. 4,447,083, the disclosures of which are incorporated herein by reference. In this known pan head the compensating device is a spring assembly. It is important for a uniform swivel that the device fitted on the pan head is "balanced" in the resting position, i.e., that when the common mass center of the rotor and the device is located vertically above the pitch axis, no torque is produced by the spring assembly. When the pan head is inclined out of the resting position, equal torques or pitching moments then exist in both directions if there are equal and opposite angles of rotation, these moments being compensated by equally great load moments produced by the spring assembly so that the device is kept in balance in virtually every pitching position. The operator thus requires only little force to rotate the device.

The German Patent No. 27 17 772, that likewise describes a compensating device for a pan head, discloses balancing a film or television camera by demounting the compensating device, a spring assembly, while the pan head is held approximately in the resting position, then exactly determining the resting position and finally mounting the spring assembly again between the rotor and the stator of the pan head in the resting position. The determination of the resting position—i.e., the balancing—requires sensitivity on the part of the operator since the exact resting position in which the camera is in unstable balance with the compensating device demounted must be "felt", so to speak, by carefully swiveling the rotor.

In the resting position the camera, or its optical axis, should also be kept horizontal. For this purpose it is known to keep the camera on the rotor in a slide assembly and to shift it when the slide assembly is in a horizontal position until zero torque is "felt". The mass center of the rotor and the camera is then located vertically above the pitch axis. This method is as elaborate as that mentioned above and again requires sensitivity and time. These two methods can of course also be combined.

SUMMARY OF THE INVENTION

The principal object of the present invention is to provide a pan head of the type described above which facilitates the determination of the torque and the "balancing" of the device and also permits this to be optionally performed in positions other than the resting or zero position.

It is a further object of the present invention to detect the torque exerted by the camera about the pitch axis in a pan head for a film or television camera.

It is a further object to modify the position of the camera on the pan head on the basis of the detected torque in order to minimize the torque about the pitch axis.

A still further object is to adjust a load moment to the torque exerted by the camera about the pitch axis, in such a way that the camera is held virtually in every pitching position without the help of a camera man.

These objects, as well as other objects which will become apparent in the discussion that follows, are achieved, in accordance with the present invention, by providing in the pan head a torque sensor that permits detection or determination of the torque of the rotor and the rotor-supported device relative to the pitch axis in every pitching position. In a pan head for a film or television camera such an assembly permits detection of the torque exerted by the camera about the pitch axis not only in the resting or zero position, but also in every pitching position of the camera about the pitch axis. This measurement makes it possible to compensate the torque—manually or automatically—in every pitching position of the rotor.

Depending on the application, different torque sensors can be used; e.g., sensors that operate with the wire strain gauges, Hall elements or field plates, position-sensitive detectors (PSD), moving-coil systems or capacitive path measurements.

The preferred embodiment of the torque sensor is a mechano-electronic assembly with bars that are sensitive to tension, pressure or bending and are part of the lock between the stator and the rotor, and a measuring assembly for detecting the deformation of the bars. The deformation can be detected optoelectronically, for example, or with the aid of wire strain gauges. The torque sensor is only switched on briefly for determining the torque and balancing the pan head, e.g. a swiveling tripod head with a fitted camera. During normal operation of the pan head the torque sensor remains inactive.

The preferred embodiments of the present invention will now be described with reference to the accompanying drawings.

DESCRIPTION OF THE PREFERRED EMBODIMENTS

Figure 1:
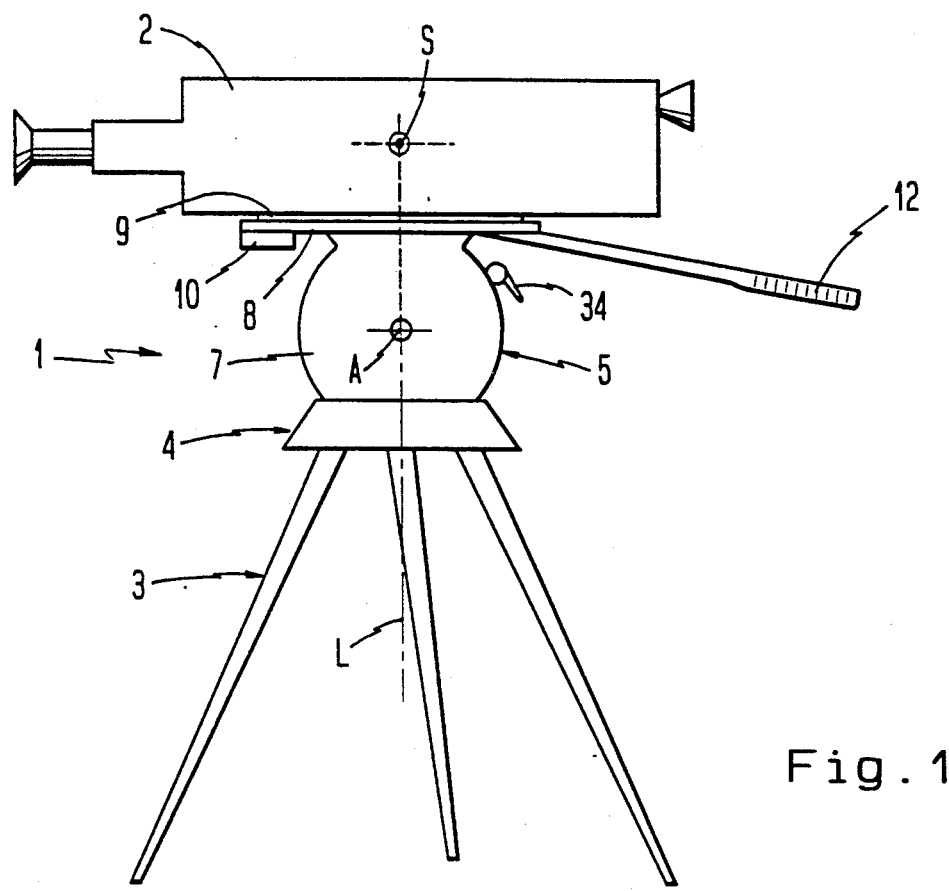
FIG. 1 is a schematic representation of a pan head for a film or television camera.
Figure 2:
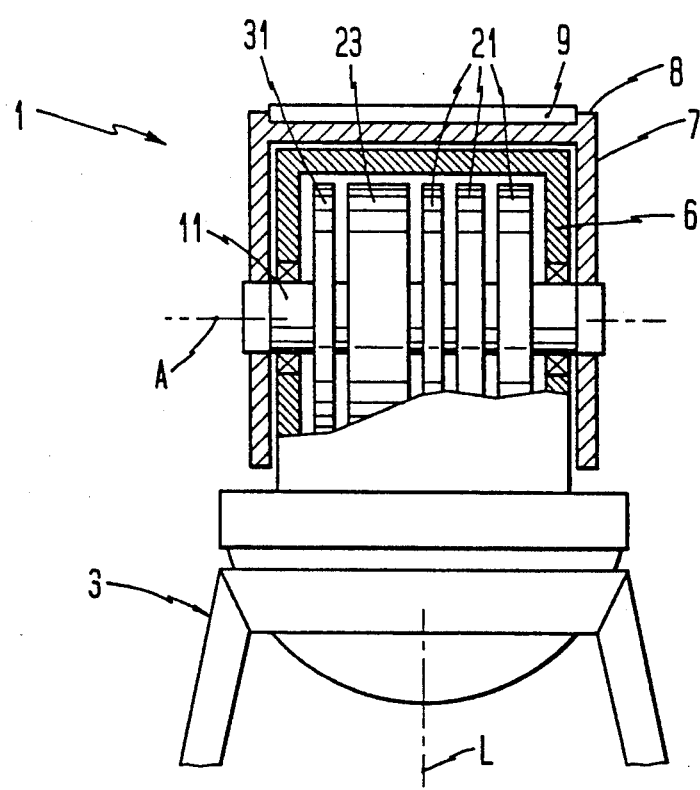
FIG. 2 is a partly sectional schematic representation of the pan head of FIG. 1 with a stator and a rotor and a torque sensor coupling the two.

FIG. 1 shows a pan head 1 for a film camera 2 that is fitted on a three-legged pedestal 3. Pan head 1 comprises a sluing unit 4 and a pitching unit 5 that pivot about a vertical axis L and a horizontal pitch axis A, respectively. Pitching unit 5 comprises a stator 6 supported on sluing unit 4 and a rotor 7 connected with a receiving platform 8 on which film camera 2 is fitted. Film camera 2 is seated on a schematically indicated slide assembly 9 that is displaceable in receiving platform 8 with the aid of an adjusting means 10 only suggested in FIG. 1. Rotor 7, which embraces stator 6 as shown in FIG. 2, is connected with a shaft 11 mounted coaxially to axis A and within stator 6. Handles 12 protrude from receiving platform 8 to permit pan head 1 to be swiveled about horizontal axis A and vertical axis L.

As schematically shown in FIG. 2, several, e.g. three, hydraulic damping units 21 are provided in stator 6 of pan head 1 on shaft 11. These damping units consist, as described in more detail in the above-mentioned German Patent No. 26 57 692, of two sets of combing damping disks with a hydraulic fluid, e.g. a viscous silicone compound, provided therebetween. One set of damping disks is connected with shaft 11 and thus with rotor 7, whereas the other set is to be locked to stator 6, e.g. with the aid of folding toggles. When a damping unit 21 is locked to the stator with the aid of a toggle, movement of pan head 1 about pitch axis A is accordingly damped. Depending on the desired damping, a plurality of such damping units 21 can be locked to stator 6.

In stator 6 of pan head 1 there is also a compensating device 23 for producing an opposite and equal torque to the torque acting upon rotation of pan head 1 about axis A, in order to keep pan head 1 with fitted camera 2 in balance in every pitching position. An adjusting means (not shown here) is provided for compensating device 23 to be adapted in accordance with the weight of fitted camera 2.

Figure 3:
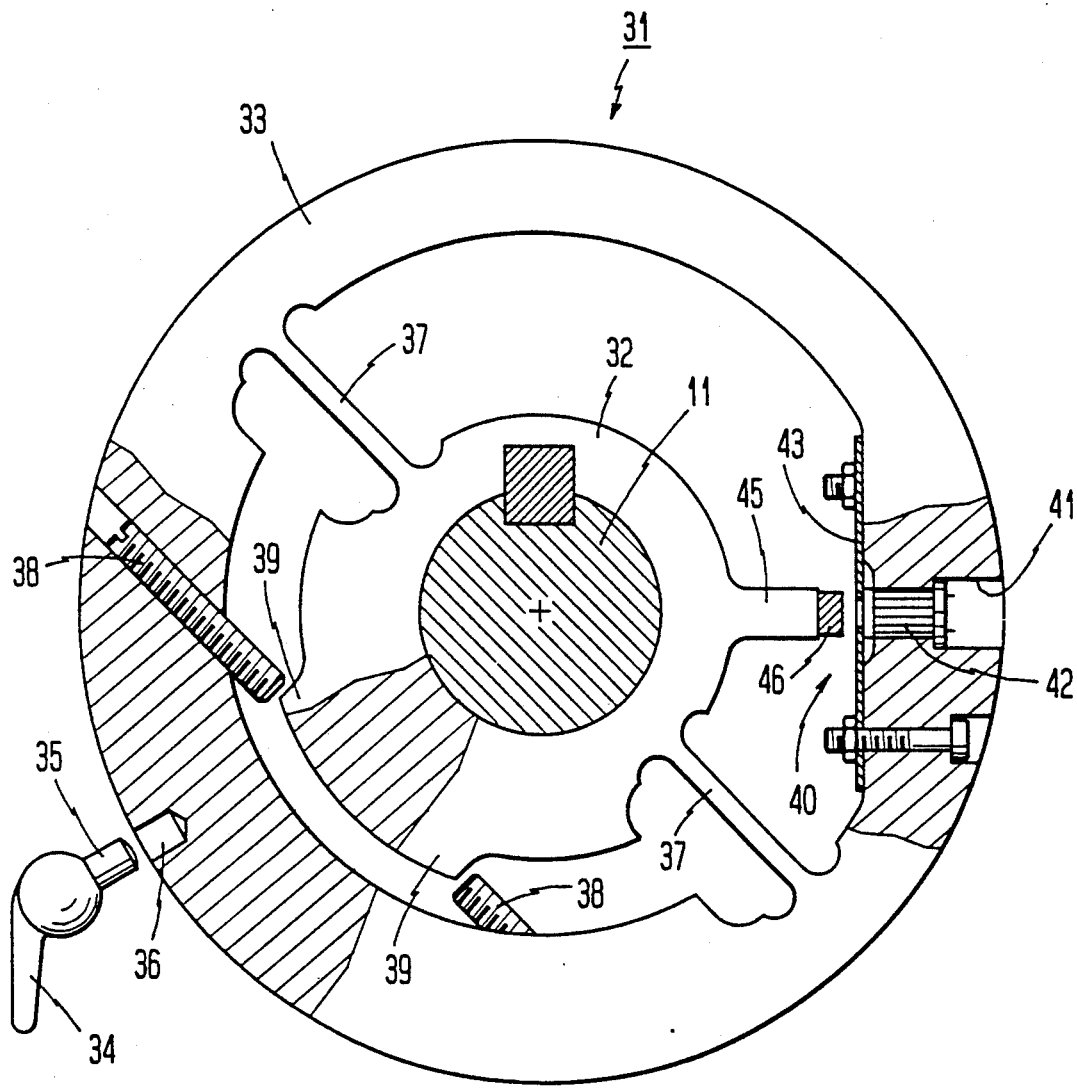
FIG. 3 is a more detailed representation of the torque sensor of FIG. 2, that is designed as a bending bar assembly with an optoelectronic sensor.

A torque sensor 31 is also provided in stator 6, being likewise disposed on shaft 11 in accordance with FIG. 2 and its structure being shown in more detail in FIG. 3.

This torque sensor 31 has an inner ring 32 that is pushed onto shaft 11 and locked thereto, and thus also to rotor 7, so as to rotate therewith. An outer ring 33 concentric with shaft 11 can be locked to stator 6 with the aid of a swivel bolt 34 mounted on stator 6. For this purpose a locking pin 35 engages a corresponding recess 36 in outer ring 33. Several such recesses 36 may also be present to permit outer ring 33 to be locked at different pitching angles of rotor 7.

Inner ring 32 and outer ring 33 are interconnected with the aid of two bending bars 37 extending radially and disposed on opposite sides of shaft 11. Two threaded bolts 38 are screwed into outer ring 33 that extend along a chord of outer ring 33 and each point to noses 39 of inner ring 32. Threaded bolts 38 and noses 39 are disposed in such a way as to permit a small relative rotation of rings 32 and 33 in both directions, starting from a central position.

Figure 4:
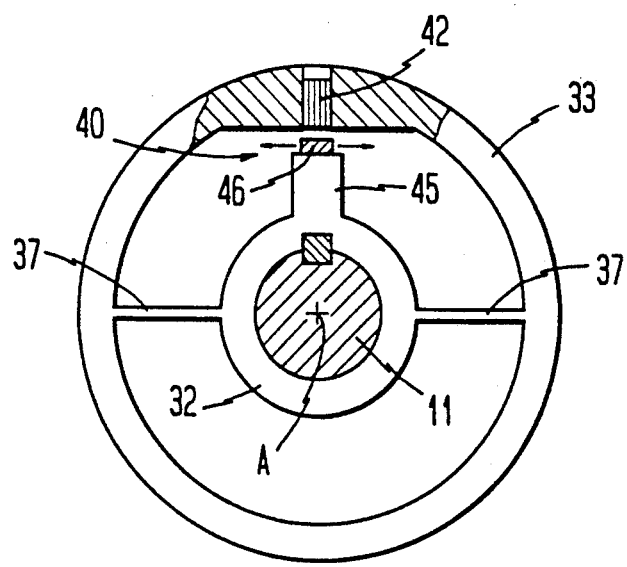
FIGS. 4, 5 and 6 are representations of various modifications of torque sensors with bending, tension and pressure bars, respectively.
Figure 5:
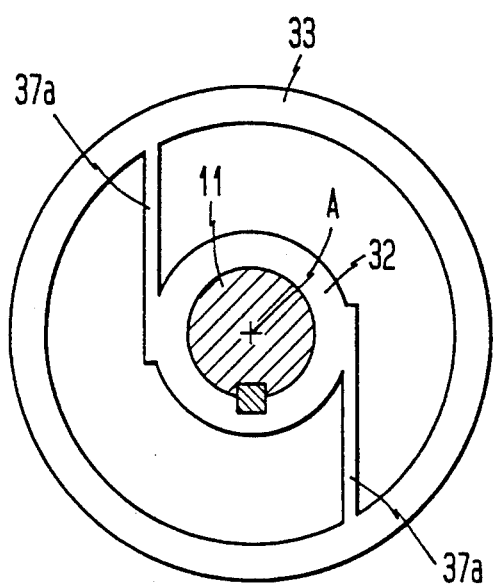
Figure 6:
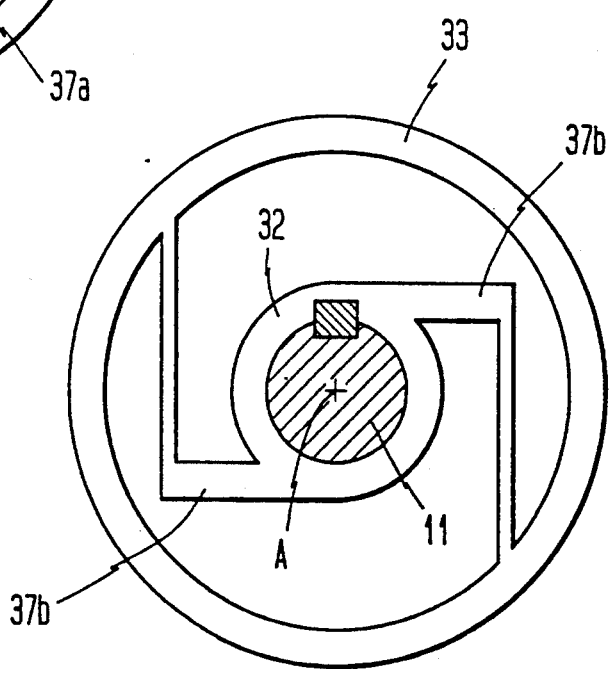

Instead of interconnecting rings 32 and 33 by radial bending bars 37 as shown in FIGS. 3 and 4, one can also connect them, e.g. by tension or pressure bars 37a as in FIG. 5, that are affixed to inner ring 32 on opposite sides of axis A and guided tangentially to the opposite side of outer ring 33. FIG. 6 shows a combination of bending bars and tension or pressure bars, whereby bars 37b first protrude tangentially from inner ring 32 as in FIG. 5 and are then bend at right angles and guided along two chords opposite axis A on opposite sides of outer ring 33.

Figure 7:
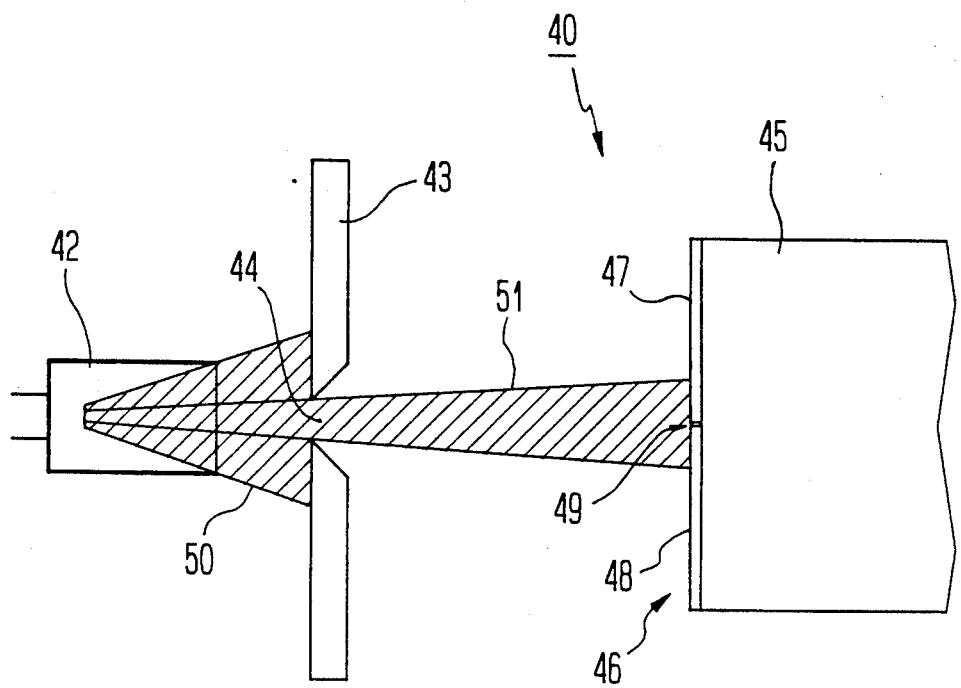
FIG. 7 is a representation of the optoelectronic sensor used in the torque sensor of FIG. 3.

An optoelectronic sensor 40 is also connected with the ring assembly. For this purpose a stepped through bore 41 is provided in outer ring 33, of FIG. 3, and a light-emitting diode 42 inserted thereto for emitting infrared in the direction of a diaphragm 43 having a slot 44 that is attached to the inside of ring 33; cf. also FIG. 7. Inner ring 32 has a radial arm 45 pointing toward diaphragm 43 and having disposed on its face a differential photodiode 46 whose measuring surface is parallel to diaphragm 43. Differential photodiode 46 operated in the nonconducting direction comprises two parallel photodiodes 47 and 48 having common cathode, the photosensitive surfaces of the two photodiodes being separated from each other by a narrow slot 49 having a width of some micrometers, in this case just under 100 micrometers. In the inoperative position of torque sensor 31 this narrow slot 49 extends parallel to the longitudinal center line of slot 44 in diaphragm 43.

Figure 8:
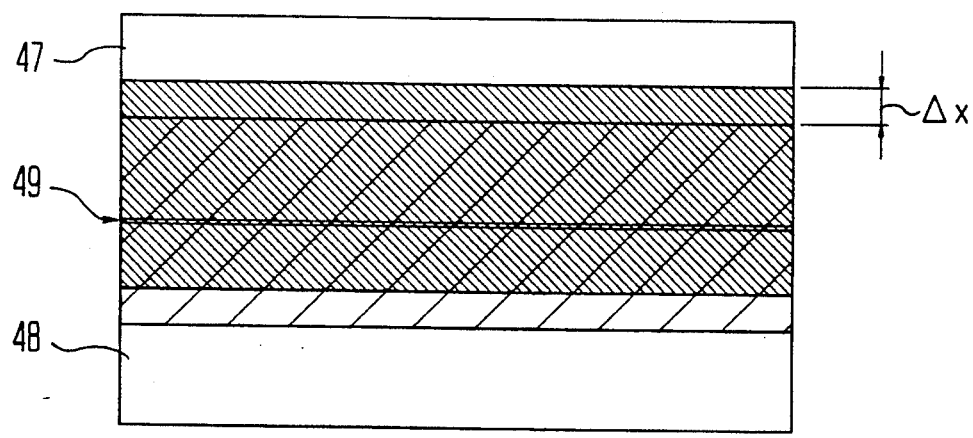
FIG. 8 is a schematic representation of a differential photodiode used in the optoelectronic sensor of FIG. 7.

Infrared diode 42 emits a pencil of rays 50 of which only one portion 51 passes through slot 44 of diaphragm 43 and illuminates surfaces 47 and 48 of differential photodiode 46 located therebehind. When outer ring 33 of torque sensor 31 is unlocked with the aid of swivel bolt 34, this ring rotates freely with inner ring 32 so that no torques are transmitted between rings 32, 33. In this unlocked position of torque sensor 31 equally large parts of the photosensitive surfaces are illuminated on photodiodes 47 and 48 and an equally great photocurrent flows in each case. When outer ring 33 is locked to stator 6 with the aid of swivel bolt 34 for determining the torque, and the camera is not "balanced" in this measuring position, e.g. the zero position of rotor 7, inner ring 32 connected with rotor 7 is accordingly rotated relative to outer ring 33 so that the differential photodiode is also shifted. FIG. 8 shows the resulting lighting conditions in a front view of the photosensitive surfaces of photodiodes 47 and 48 and—shaded over a wide area—in a position shifted by delta x. In the shifted position the illuminated surface of one of photodiodes 47, 48, in this case photodiode 47, is greater than that of the other photodiode 48 so that the photocurrent of photodiode 47 becomes accordingly greater. There are fundamentally several possibilities for evaluating the photocurrents of photodiodes 47 and 48. Since the photocurrents depend on the luminous intensity, on the one hand, and on the illuminated surface, on the other hand, the two photocurrents can be measured and their ratio formed by a divider. The output voltage of the divider is then proportional to the delta x shift. Another possibility is to regulate the current of the photodiode to ensure a constant luminous intensity. The current flowing through photodiodes 47, 48 in each case is then only dependent on the size of the particular illuminated surface, whereas the sum of the two currents is constant.

The measurement of one photocurrent is thus sufficient for measuring the delta x shift; the other current is redundant. Regardless of the principle of measurement used, the measuring result is displayed or made available for further application after a current/voltage transformation of the output signal of the optoelectronic sensor. The display may be, for example, a bar display, light-emitting diode display, numerical display or analog display with the aid of a moving-coil instrument.

Figure 9:
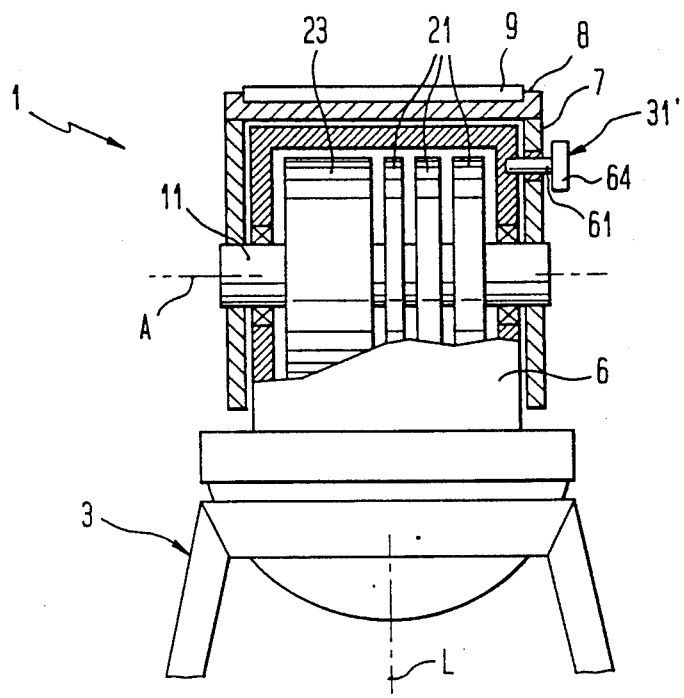
FIG. 9 is a schematic representation of a pan head for a film or television camera with a torque sensor designed as a bolt.
Figure 10:
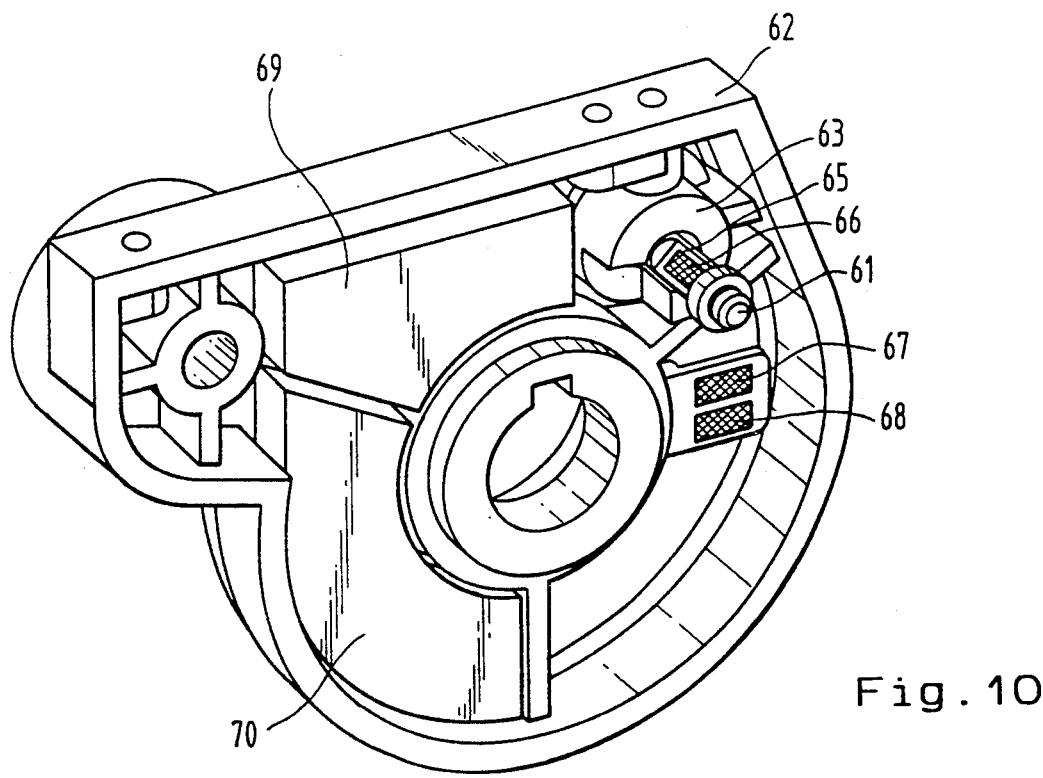
FIG. 10 is a perspective view of one half of a rotor of the pan head with the torque sensor according to FIG. 9.

As in FIGS. 9 and 10, torque sensor 31' has in a different embodiment a locking bolt 61 guided on a side wall 62 of rotor 7 in a sleeve 63 parallel to pitch axis A. Locking bolt 61 can be displaced with the aid of an external handle 64 parallel to pitch axis A, so that locking bolt 61 either passes with its front end into a correspondinq recess in stator 6, as shown in FIG. 9, thereby locking the rotor and stator together, or is withdrawn from this recess, so that rotor 7 swivels freely about pitch axis A.

Locking bolt 61 has a bending zone 65 formed by a weakening of material on each opposite side of the bending bolt. On the bottom of the bending zone there is a wire strain gauge 66 on each side of the locking bolt, only one of which is visible in FIG. 10. Two further wire strain gauges 67 and 68 are affixed to the inside wall of side portion 62 of the stator in the vicinity of locking bolt 61. In some of the cavities in side wall 62 there are two boxes 69 and 70 containing an electronic circuit and batteries for evaluating the output and the two wire strain gauges 67 and 68 serving as a reference. The four wire strain gauges are each used as resistors of a four-way full bridge circuit, whereby two opposite bridge points are supplied to a differential amplifier that provides an output signal in accordance with the deflection of locking bolt 61 in bending zone 65. This signal can be supplied to a display, so that the torque about pitch axis A is directly displayed and indicates to the camera man that the camera is not exactly balanced. The camera can then be balanced manually or, as explained below, automatically.

At least two recesses are provided in the stator to take up the locking bolt therein, whereby in the first locked position the rotor has the angle of rotation ZERO relative to the stator, thus being in the resting position, and in the other position it is swiveled relative to this position, assuming e.g. a pitching angle between 10° and 30°. If the camera is exactly balanced, i.e. the center of gravity of the rotor and camera is vertical above pitch axis A in the resting position and a torque exactly opposite to the torque of the rotor and camera is exerted by a compensating device in pitching positions, the camera remains at rest in virtually all pitching positions.

One advantage of the arrangement of wire strain gauges 67 and 68 serving as a reference in the vicinity of the locking bolt is that approximately the same temperature prevails there as at the locking place, so that the measurement of the torque is virtually temperature-independent. Particularly good measuring results are obtained if the locking bolt and rotor are made of the same material, e.g. steel. An advantage of using wire strain gauges is the low current demand for the evaluation circuit and also for the display.

Possible applications will be described with reference to FIGS. 11, 12 and 13. These figures show schematically pitch axis A of pan head 1 with receiving platform 8 displaceable by the slide assembly, the common center of gravity S of the rotor and camera, compensating device 23 equipped with a compensation spring 52, torque sensor 31 or 31' and a display 51, whereby the rotary position of pan head 1 is shown offset by 90° and additionally indicated.

Figure 11:
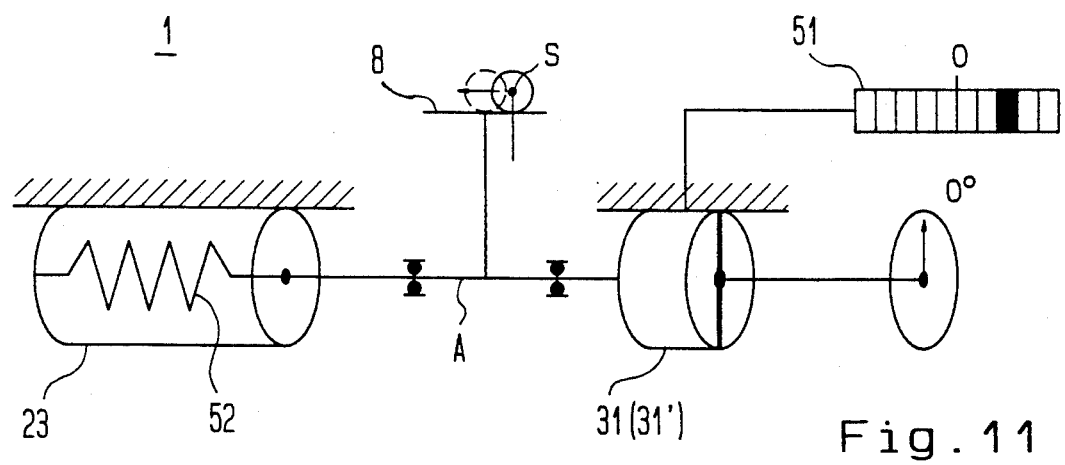
FIGS. 11 to 13 are each schematic representations for applications of a torque sensor.

According to FIG. 11, pan head 1 is equipped with a non-adjustable compensating device 23 adapted to the camera's weight and having a compensation spring 52 e.g. a spirally wound torsion spring. Camera platform 8 of pan head 1 is horizontal, as shown, and indicated by angle of rotation 0°. When torque sensor 31 or 31' is switched on, a torque signal other than ZERO, which is shown by a black bar, appears on display 51 if the camera is not balanced. The camera is shifted on receiving platform 8 with the aid of the slide assembly until torque ZERO is displayed and center of gravity S, as shown by broken lines, is thus directly vertical above pitch axis A.

Figure 12:
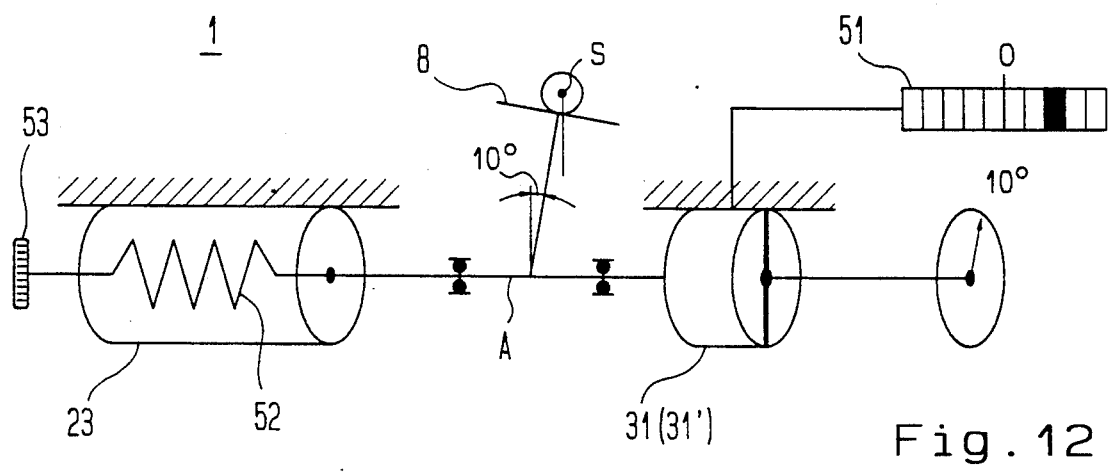

FIG. 12 shows the same arrangement as FIG. 10, except that compensation spring 52 of compensating device 23 is adjustable with the aid of a handle 53, so that e.g. its prestress and point of attach are infinitely variable. If compensation spring 52 cannot be rendered inoperative in the locked zero position of the pan head, part of the pitching moment can also be taken up by compensation spring 52 in the locked zero position, so that there is a certain dependence of the measured signal provided by the moment measurement on the adjustment of infinitely variable compensation spring 52. This dependence can be easily eliminated or mitigated by providing a gain adjustment proportional to the adjustment of compensation spring 52 during processing of the moment measuring signal. After the balancing process the arrangement according to FIG. 12 can also be used to adjust the compensation spring 52. For this purpose one inclines pan head 1 forward about pitch axis A, for example by 10°, and locks it by torque sensor 31 or 31' relative to the pedestal. When the adjustable compensation spring 52 is correctly adjusted the torque ZERO appears on display 51. If this is not the case, as in FIG. 12, one uses handle 53 to adjust compensation spring 52 until moment measured by torque sensor 31 or 31' is adjusted to ZERO.

The described manual adjusting measures can be performed automatically with the aid of motor operators if sufficient auxiliary energy is made available.

Figure 13:
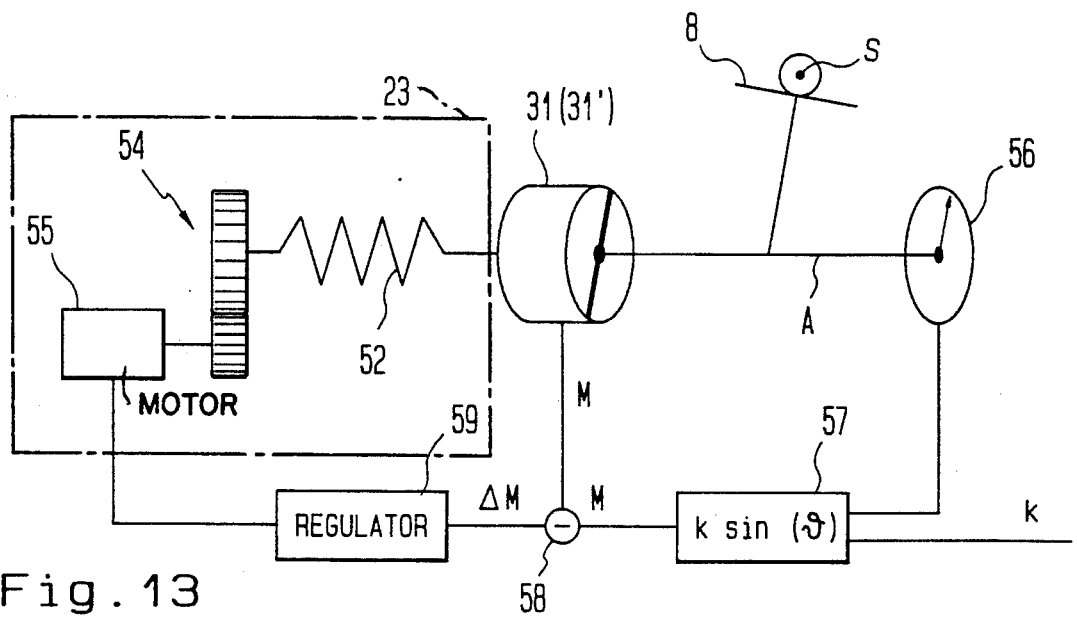

FIG. 13 shows a continuous follow-up of a compensating device 23, this compensating device being designed in accordance with the aforementioned German Patent No. 39 08 682, in which the rotor of the pan head is connected by a step-down gear unit 54 with a lever arm acting on a compensation spring assembly 52. The length of the effective lever arm, that determines the compensating moment, is adjusted via a self-locking gearing 54 with the aid of a d.c. motor 55. Torque sensor 31 is inserted between spring assembly 52 and receiving platform 8 swiveling about pitch axis A. Torque sensor 31 or 31' therefore measures the current compensating moment actually applied by spring assembly 52, i.e. actual value $M_{Ist}$. The measurement of the current rotary position with the aid of a rotary angle transmitter 56 can be used to determine the desired value $M_{soll}$ of the compensating moment in a preliminary stage 57, including a factor k coordinated with the current camera weight. The actual value and the desired value are compared in a differential stage 58, that provides a signal corresponding to the mutual deviation, delta M, of the two values. On the basis of this value a regulator 59, most simply a proportional-working regulator with relatively high gain, provides a desired value for an underlying current regulator circuit of d.c. motor 55. With this motor 55, self-locking gearing 54 can rotate non-ideal compensation spring 52 and thus adapt the current compensating moment to the desired value. The factor k required for calculating the desired value is either predetermined or else determined automatically with reference to the adjusting measures, in accordance with FIGS. 11 and 12.

There has thus been shown and described a novel pan head for film and television cameras which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. In a pan head for supporting a device, in particular a film or television camera, having a stator and a rotor swiveling about a pitch axis and supporting the device, the improvement wherein the pan head comprises a torque sensor for detecting the torque of the rotor and the supported device about the pitch axis.

2. The pan head of claim 1, wherein the torque sensor has a mechanical connection between the stator and rotor, this mechanical connection having a bending element that is elastically deformed if there is a torque about the pitch axis, and wherein the torque sensor has a sensor for detecting the deformation of the bending element.

3. The pan head of claim 2, wherein the mechanical connection between the stator and rotor is separable.

4. The pan head of claim 1, wherein the torque sensor has an inner and an outer ring that are coaxial to the pitch axis, one ring being connected with the stator and the other ring with the rotor with at least one of these connections being separable, wherein the inner and outer rings are interconnected by a bar assembly consisting of elastically deformable bars, and wherein a sensor is provided for measuring the relative rotation between the inner and outer rings.

5. The pan head of claim 4, wherein the sensor is an optoelectronic sensor comprising a light-emitting diode connected with one ring, a slit diaphragm and a differential photodiode connected with the other ring, the measuring surface of the photodiode being disposed parallel to the diaphragm.

6. The pan head of claim 4, wherein the light-emitting diode and the slit diaphragm are disposed in the outer ring, and the differential photodiode on a radial arm of the inner ring.

7. The pan head of claim 1, wherein the torque sensor has a bolt locking the stator and rotor together in a first position and separating the two in a second position wherein the bolt has a bending zone that is deflected when the rotor and stator are locked and there is a torque about the pitch axis, and wherein a sensor detecting the deflection of the bending zone is provided in said zone.

8. The pan head of claim 7, wherein the bolt is a slide with a locking bolt that is guided parallel to the pitch axis of the pan head.

9. The pan head of claim 8, wherein the locking bolt has as a bending zone an area with a weakened cross section.

10. The pan head of claim 7, wherein the sensor has at least one wire strain gauge that is connected mechanically with the bolt in the bending zone thereof.

11. The pan head of claim 10, wherein the wire strain gauge is a resistor of an electric bridge circuit.

12. The pan head of claim 10, wherein the bolt has in the bending zone two wire strain gauges situated on opposite sides of the bolt, wherein two further wire strain gauges are connected mechanically with the rotor or stator near the bending zone, and wherein each wire strain gauge on the bolt is a precision resistor and each of the other two wire strain gauges is a reference resistance in one of four branches of a measuring bridge circuit.

13. The pan head of claim 12, wherein the bolt, at least in the bending zone, and the material at the place of reference of the wire strain gauges serving as a reference have approximately the same thermal properties.

14. The pan head of claim 1, wherein a display is provided for the output signals of the torque sensor.

15. In a pan head for supporting a device, in particular a film or television camera, having a stator and a rotor swiveling about a pitch axis and supporting the device, the improvement wherein the pan head has a torque sensor for detecting the torque of the rotor and the supporting device about the pitch axis, and the pan head has an apparatus for adjusting the torque to a minimum in accordance with the output signals of the torque sensor.

16. The pan head of claim 15, wherein the rotor has a receiving platform with a slide assembly for supporting the device, and wherein an adjusting means to be operated with reference to the output signals of the torque sensor is provided for longitudinal adjustment of the slide assembly.

17. The pan head of claim 16, further comprising means for operating the adjusting means electrically.

18. The pan head of claim 15, wherein the pan head has an adjustable compensating device for producing an equal and opposite torque to the particular torque of the rotor and the supported device, and wherein the compensating device has an adjusting means that is adjustable with reference to the output signals of the torque sensor to compensate the amount of load.

19. The pan head of claim 18, wherein the adjusting means has a d.c. motor.

20. The pan head of claim 18, wherein the pan head has associated with the torque sensor a rotary angle transmitter, wherein a regulator circuit is provided in which the desired value for the load moment is compared with the actual value applied by the compensating device and determined by the torque sensor, with reference to the output signals of the rotary angle transmitter and with consideration of the weight of the device, and wherein the regulator circuit actuates a motor operator for adjusting the compensating device to the desired point of the torque.

* * * * *